(12) United States Patent
Kim

(10) Patent No.: US 7,796,653 B2
(45) Date of Patent: *Sep. 14, 2010

(54) APPARATUS AND METHOD FOR DEMULTIPLEXING OF TRANSPORT STREAM

(75) Inventor: Sung-tae Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1490 days.

This patent is subject to a terminal disclaimer.

(21) Appl. No.: 11/153,432

(22) Filed: Jun. 16, 2005

(65) Prior Publication Data

US 2005/0243873 A1 Nov. 3, 2005

Related U.S. Application Data

(63) Continuation of application No. 09/840,148, filed on Apr. 24, 2001, now Pat. No. 6,970,482.

(30) Foreign Application Priority Data

Jul. 14, 2000 (KR) .................................. 2000-40629

(51) Int. Cl.
*H04J 3/02* (2006.01)
(52) U.S. Cl. ...................................... 370/542; 370/487
(58) Field of Classification Search ................. 370/542, 370/536, 412, 428, 535, 401, 386, 463, 419, 370/537, 485, 486, 487, 488, 395.64
See application file for complete search history.

(56) References Cited

U.S. PATENT DOCUMENTS

| | | | |
|---|---|---|---|
| 6,181,706 B1 * | 1/2001 | Anderson et al. ........... | 370/412 |
| 6,252,907 B1 | 6/2001 | Hwang | |
| 6,359,911 B1 * | 3/2002 | Movshovich et al. ....... | 370/536 |
| 6,434,170 B1 | 8/2002 | Movshovich et al. | |
| 6,438,145 B1 * | 8/2002 | Movshovich et al. ....... | 370/536 |
| 6,463,059 B1 * | 10/2002 | Movshovich et al. ....... | 370/389 |
| 6,731,657 B1 * | 5/2004 | Anderson et al. ........... | 370/536 |
| 6,931,198 B1 * | 8/2005 | Hamada et al. ............. | 386/46 |
| 6,973,258 B1 * | 12/2005 | Yoo et al. ................... | 386/111 |

(Continued)

FOREIGN PATENT DOCUMENTS

CN 12290552 9/1999

(Continued)

OTHER PUBLICATIONS

Notice of Allowance dated Jul. 5, 2005 for related U.S. Appl. No. 09/840,148.

(Continued)

*Primary Examiner*—Brian D Nguyen
(74) *Attorney, Agent, or Firm*—Staas & Halsey LLP

(57) ABSTRACT

A transport stream (TS) demultiplexer has a TS input switch unit and an output switch unit, whereby inputs and outputs can be selected as desired, external output can be easily changed by changing selected information of the TS input switch unit and the output switch unit, without changing inputs. Therefore, the TS demultiplexer receives a plurality of TSs such as MPEG-2 TSs and DSS TSs, and can selectively demultiplex the TSs, and particularly, the TS demultiplexer can store the TSs in a storage medium such as a hard disc drive, or it can easily transmit the TS data over an IEEE1394 bus or a PCI bus.

5 Claims, 2 Drawing Sheets

U.S. PATENT DOCUMENTS 7,150,029 B1 * 12/2006 Ebling et al. .................. 725/39

FOREIGN PATENT DOCUMENTS

| JP | 2000-83064 | 3/2000 |
| WO | 99/60736 | 11/1999 |

OTHER PUBLICATIONS

Final Office Action dated Mar. 4, 2005 for related U.S. Appl. No. 09/840,148.

Office Action dated Aug. 11, 2004 for related U.S. Appl. No. 09/840,148.

Chinese Office Action corresponding to Chinese Patent Application No. 01112112.2 dated Apr. 16, 2004.

* cited by examiner

APPARATUS AND METHOD FOR DEMULTIPLEXING OF TRANSPORT STREAM

CROSS-REFERENCE TO RELATED APPLICATION

This application is a continuation of U.S. application Ser. No. 09/840,148, now U.S. Pat. No. 6,970,482 filed Apr. 24, 2001, which claims the benefit of Korean Patent Application No. 00-40629 filed Jul. 14, 2000. The disclosures of the foregoing applications are all incorporated herein by reference.

BACKGROUND OF THE INVENTION

1. Field of the Invention

The present invention relates to a demultiplexer, and more particularly, to a demultiplexing apparatus and method, which simultaneously demultiplexes a plurality of transport streams (TSs) having different structures so that TSs can be stored in a storage medium such as a hard disc drive (HDD), or TSs can be easily transmitted through an IEEE1394 or peripheral component interconnect (PCI).

2. Description of the Related Art

To transmit encoded audio, video and other supplement data (program selection information, program guide information, scramble information, etc.) in digital satellite broadcasting or ground wave broadcasting, data should be packetized, multiplexed into a program stream (PS) or a transport stream (TS), and then transmitted.

The TS is used mainly for the case where bit streams are to be transmitted through a medium which has a high possibility of errors. Within the TS, the size of a packet is fixed so that parity information can be added for error correction.

In the case when using moving picture experts group-2 (MPEG-2), the size of a TS packet is fixed at 188 bytes, and each packet is formed of a 4-byte header and a 184-byte payload.

Meanwhile, in the case when using distributed sample scramble (DSS), the size of a TS packet is fixed at 130 bytes, and each packet is formed of a 2-byte prefix (header) field and a 128-byte transmission block (payload).

The header of each packet contains packet identification (PID, or SCID in DSS's case), which indicates what information is loaded in the payload, and scramble information as well. The payload loads video, audio, and other tables, wherein the tables include a program map table (PMT) and a program association table (PAT), which is formed by the program map tables.

The DSS TS demultiplexer has been implemented in various ways by multiple companies, and the models can be roughly divided into two types: a type having an embedded microprocessor for demultiplexing, and the other type without the microprocessor.

Meanwhile, the MPEG-2 TS demultiplexer of C-cube Co., which is now widely used, has an embedded Reduced Instruction Set Computer (RISC) engine. This demultiplexer cannot process a DSS TS, but can process an MPEG-2 TS.

There are demultiplexers sold by some companies in addition to C-cube's demultiplexer. However, these demultiplexers cannot process a DSS TS, or even when a DSS TS can be processed, these demultiplexers cannot simultaneously process a DSS TS and MPEG-2 TS due to limitations of having only one input for receiving a TS. Also, in a TS transmitted through PCI or IEEE1394, a predetermined packet cannot be replaced with a new packet, and a path for processing TS data cannot be changed in a state where the TS input is fixed.

SUMMARY OF THE INVENTION

To solve the above and other related problems, it is an object of the present invention to provide an apparatus and method for demultiplexing a plurality of transport streams (TSs) having different structures, and either storing the TSs in a storage medium such as an HDD, or making transmission of the TSs over an IEEE1394 bus or a PCI bus easier.

Additional objects and advantages of the invention will be set forth in part in the description which follows and, in part, will be obvious from the description, or may be learned by practice of the invention.

To accomplish the foregoing objects of the present invention, there is provided a transport stream (TS) demultiplexer for demultiplexing a plurality of transport streams of data having different structures, the TS demultiplexer having a TS input switch unit selecting TS data to be processed among a plurality of TSs of data; a packet identification (PID) filter unit extracting only packets of data having designated PIDs among TS data selected in the TS input switch unit, and outputting the extracted packets as program data; a descrambler unit descrambling program data output from the PID filter unit; an external output interface unit selecting desired program data among extracted packets of program data provided from the PID filter unit and program data provided from the descrambler unit, and outputting the selected program data to interface externally; and a CPU unit controlling each operation of the above units to demultiplex the plurality of received TSs of data.

Since the TS demultiplexer has a TS input switch unit and an output switch unit, wherein inputs and outputs can be selected as desired, the external output can be easily changed by changing only the selected information of the TS input switch unit and output switch unit without changing inputs.

Therefore, the demultiplexer of the present invention can selectively demultiplex multiple types of input data such as MPEG-2 TSs and DSS TSs, and particularly, can store the data in a storage medium such as a hard disc drive, or make data transmission over a IEEE1394 bus or a PCI bus easier.

BRIEF DESCRIPTION OF THE DRAWINGS

These and other objects and advantages of the present invention will become apparent and more readily appreciated from the following description of the preferred embodiments thereof, taken in conjunction with the accompanying drawings in which.

DETAILED DESCRIPTION OF THE PREFERRED EMBODIMENTS

Figure 1:
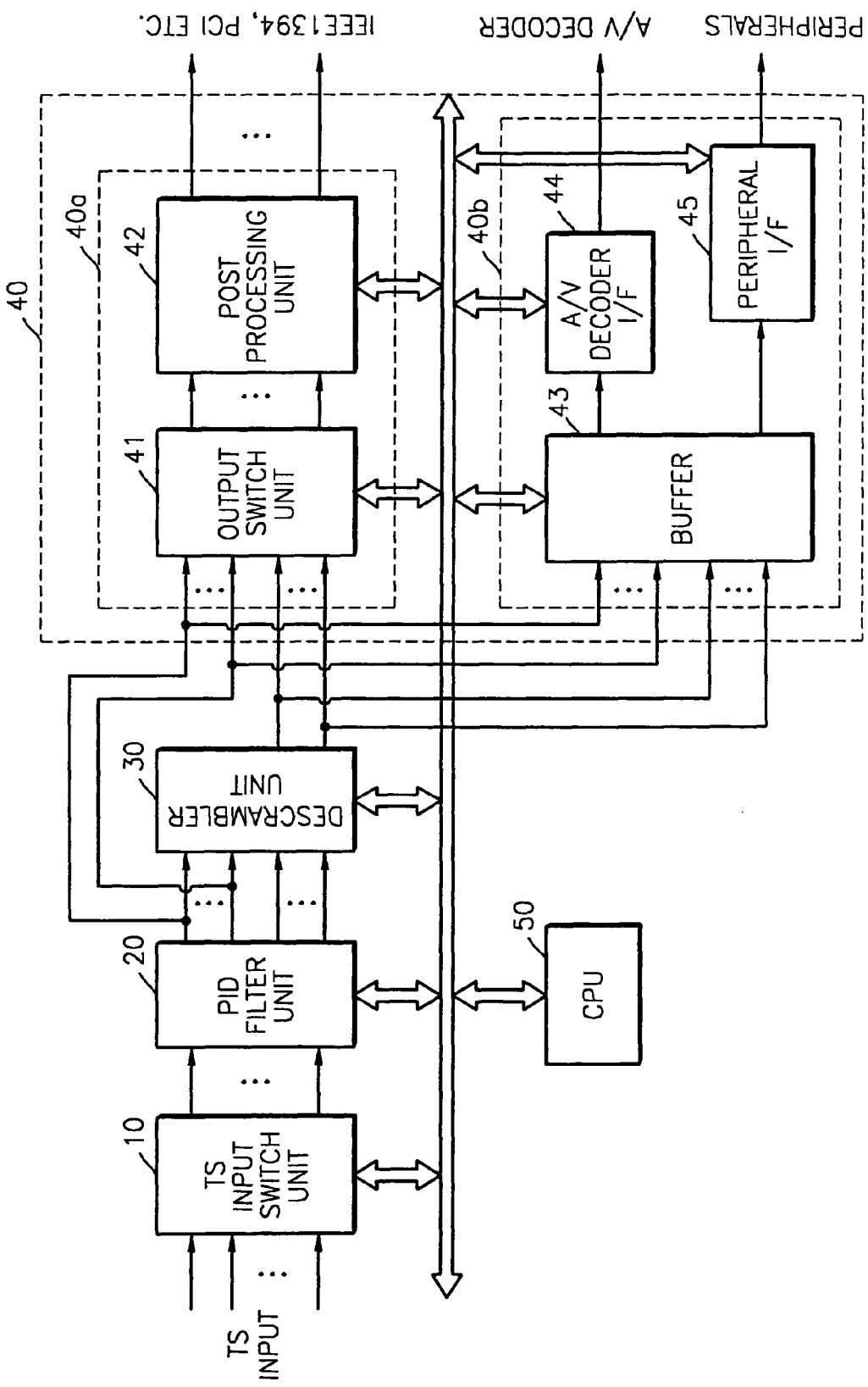
FIG. 1 illustrates a block diagram of an apparatus for demultiplexing a transport stream (TS) according to the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

FIG. 1 illustrates the structure of a transport stream (TS) demultiplexer to which an embodiment of the present invention is directed.

A TS input switch unit 10 selects TS data among a plurality of received TS data and detects a synchronization signal of the selected TS data.

A packet identification (PID) filter unit 20 extracts packets of data having designated PIDs among TS data provided from the TS input switch unit 10, outputs the TS data as program data, and extracts scramble information from the header of a TS packet, which is required for descrambling by using the synchronization signal detected in the TS input switch unit 10.

A descrambler unit 30 descrambles the program data using the scramble information extracted from the PID filter unit 20, and key information and scramble modes set in a CPU 50. Also, when scrambling is needed for the external output, the descrambler unit 30 scrambles the program data. Here, program data means data formed of only packets having designated PIDs among TS data.

An external output interface unit 40 has a first external output interface unit 40a for storing the program data, which is processed by the above units, in the form of TS packets in a hard disc drive over a PCI bus, or transmitting the program data externally over an IEEE1394 bus through a network, and a second external output interface unit 40b for grouping the program data into audio/video data and supplemental data, and then transmitting the grouped data externally through an audio/video (A/V) decoder and a peripheral interface, respectively, to reproduce the program data.

The first external output interface unit 40a has an output switch unit 41 for selecting desired program data among a plurality of input program data, and a post-processing unit 42 for deleting or replacing a predetermined packet for external output.

The second external output interface unit 40b has a buffer 43 for temporarily storing program data for reproduction, an A/V decoder interface unit 44 for transmitting audio/video data stored in the buffer 43 and processed by the CPU unit 50 (to be explained) to an A/V decoder (not shown), and a peripheral interface unit 45 for outputting supplemental data stored in the buffer 43 and processed by the CPU 50 over a PCI bus to external peripherals.

The CPU 50 controls internal operations of the demultiplexer, and demultiplexes received TS data into multiple types of data to be output. Also, the CPU 50 extracts a reference time value included on TS data, and using this value, synchronizes the system time of the demultiplexer to input TS data.

Figure 2:
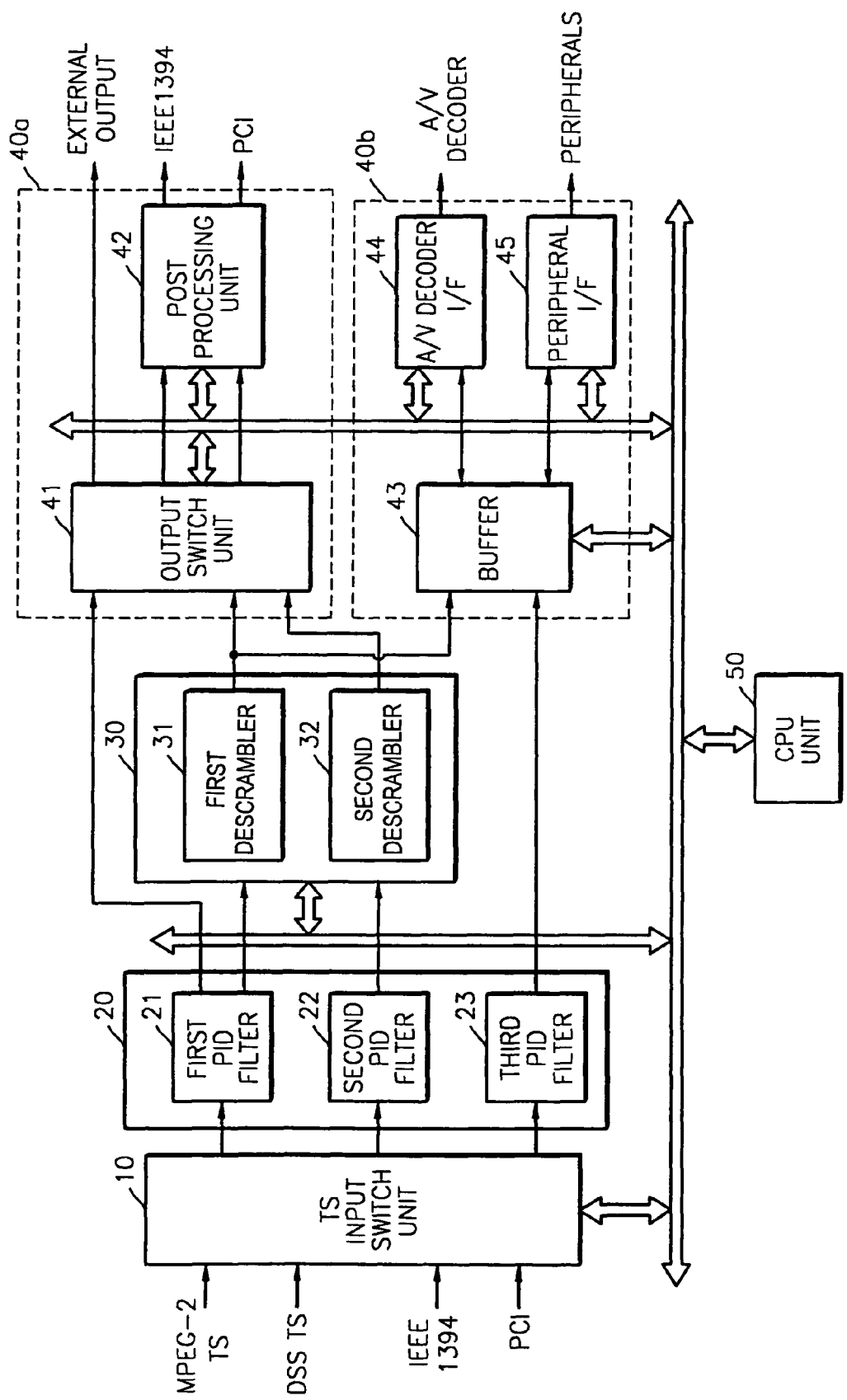
FIG. 2 illustrates a block diagram of an apparatus for demultiplexing a transport stream of the present invention in an embodiment based on the structure of FIG. 1.

The TS demultiplexer of FIG. 1 can be implemented as shown in FIG. 2.

Referring FIG. 2, the TS input switch unit 10 selects and outputs TS data in the form that the user wants, among a plurality of received TS data, according to a command from the CPU 50. At this time, the received TS data at input switch unit 10 includes MPEG-2 TSs having a packet structure of a 188-byte unit, DSS TSs having a packet structure of a 130-byte unit, TSs received over an IEEE1394 bus through a network, and TSs received over a PCI bus, and also other types of TSs can be included.

Further, the TS input switch unit 10 detects a synchronization signal to determine the header of a packet, and transmits the synchronization signal to the CPU 50.

TS data selected in the TS input switch unit 10 is transmitted to the PID filter unit 20. The PID filter unit 20 receives the synchronization signal from the CPU 50, extracts packet header information from the TS data provided from the TS input switch unit 10, and using the extracted packet header information, allows only the packets having designated PIDs to pass. Also, the PID filter unit 20, using the synchronization signal received from the CPU 50, extracts scramble information from the packet header, which is required for descrambling, and transmits the extracted scramble information to the CPU 50.

Packets which are passed through the PID filter unit 20 are then transmitted to either the descrambler unit 30, the output switch unit 41, or the buffer 43. The CPU 50 controls transmission to the descrambler unit 30, the output switch unit 41, or the buffer 43, according to the external output form that the user selects.

Program data stored in the buffer 43 is divided into audio/video data and supplemental data, and transmitted to the A/V decoder through the A/V decoder interface unit 44 and to peripherals through the peripheral interface unit 45.

The buffer 43 is a memory space for temporarily storing data, and the CPU 50 processes data stored in the buffer 43 using an address. For example, program data transmitted to the buffer 43 from the first descrambler 31 or the third PID filter 23 is stored in a divided memory location of the buffer 43 and processed by the CPU 50. Here, processing refers to classification and selection of data.

In the apparatus of FIG. 2, selection of input/output of the TS input switch unit 10 and the external output interface unit 40 is made by a selection input unit (not shown). The selection input unit can be implemented as an ordinary function key, or a program pop up menu.

The embodiment of FIG. 2 is implemented such that the first PID filter 21 transmits extracted packets of program data to the first descrambler 31 and/or the output switch unit 41, the second PID filter 22 transmits extracted packets of program data to the second descrambler 32, and the third PID filter 23 transmits extracted packets of program data to the buffer 43.

Therefore, according to the embodiment of FIG. 2, the user can reproduce and watch a desired program simultaneously while transmitting the program over an IEEE1394 through a network.

The CPU 50 transmits scramble information extracted by the PID filter unit 20 to the descrambler unit 30.

Using program data transmitted through the first PID filter 21 and the second PID filter 22 and scramble information provided from the CPU unit 50, the descrambler unit 30 descrambles the program data and outputs the descrambled program data. In addition to descrambling the scrambled program data, the descrambler unit 30 scrambles program data again when scrambling is needed to externally transmit the program data through the first external output interface unit 40A.

Program data output from the descrambler unit 30 is transmitted to the output switch unit 41 for external transmission, or to the buffer 43 for reproduction.

The output switch unit 41 selects and outputs program data to be externally transmitted, between program data transmitted from the PID filter unit 20 and program data transmitted from the descrambler unit 30. That is, program data received through the TS input switch unit 10 contains multiple programs (for example, programs from a plurality of broadcasting stations), and among them, only those programs which the user selects to be externally transmitted are ultimately output.

Meanwhile, it may be necessary to change supplemental information, such as program designation information or program guide information, which is required for demultiplexing the selected program data again later. Since a packet designated in the original program designation information can be discarded when only a predetermined packet is extracted for storing or transmitting the data processed by the apparatus shown in FIG. 2, output TS data may be incorrectly demultiplexed unless program designation information is changed and then stored. Therefore, to prevent this, the post-processing unit 42 outputs TS data after a predetermined packet has been removed or replaced with a new packet. However, program data which does not need this post-processing is directly transmitted externally.

Program data, which is output from the first external output interface unit 40a, through the above described processes, is externally transmitted over an IEEE1394 or a PCI bus.

Program data for reproducing audio/video reproduction is transmitted to the second external interface unit 40b. A TS data packet includes supplemental data, such as program designation information or additional information, as well as audio/video data, and in many cases, the supplemental data should be decoded in an external CPU. Therefore, program data transmitted from the first descrambler 31 or the third PID filter 23 to the buffer 43 is divided into audio/video data and supplemental data by the CPU 50. Then, divided audio/video data and supplemental data are transmitted, respectively, through the A/V decoder interface unit 44 to an A/V decoder (not shown), and through the peripheral interface unit 45 to peripherals. At this time, since most A/V decoders receive a packetized elementary stream (PES) or an elementary stream as input data, the A/V decoder interface unit 44 outputs a PES or an elementary stream, and the peripheral interface unit 45 transmits data mainly over a PCI bus.

In the present invention, the TS input switch unit 10 does not continuously select and process only one TS input. That is, while the TS input switch unit 10 selects an MPEG-2 TS to reproduce a program through the PID filter unit 20, a descrambler unit 30, and the second external output interface unit 40b, the TS input switch unit 10 can alternately select a DSS TS to transmit externally through the PID filter unit 20, the descrambler unit 30 and the first external output interface unit 40a.

Particularly, since the present invention has the TS input switch unit 10 and the output switch unit 41, input TS data and external output data can be easily changed as the user wants, by changing the selected information of the TS input switch unit 10 and the output switch unit 41 without changing input TS data.

As described above, since the TS demultiplexer of the present invention has the TS input switch unit 10 and output switch unit 41, wherein inputs and outputs can be selected as a user desires, the TS demultiplexer receives a plurality of TSs such as MPEG-2 TSs and DSS TSs, and reproduces a predetermined program simultaneously while transmitting the TSs externally over an IEEE1394 bus or a PCI bus.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A method of processing plural transport streams of data having different structures using a transport stream demultiplexer, the method comprising:
   simultaneously inputting the plural transport streams of data;
   simultaneously demultiplexing a first and a second of the transport streams of data, the first being a DSS transport stream and the second being a MPEG-2 transport stream; and
   selectively storing and transmitting the first and the second of the transport streams of data over an IEEE1394 bus and a peripheral component interconnect (PCI) bus, wherein the method is performed by the transport stream demultiplexer.

2. The processing method of claim 1, wherein the simultaneous demultiplexing further comprises:
   selecting the first transport stream data among the plural transport streams of data; and
   detecting a synchronization signal of the selected first transport stream data.

3. The processing method of claim 2, wherein the selecting the first transport stream data further comprises:
   extracting packet header information from the first transport stream data provided from the detected synchronization signal; and
   passing only packets having designated packet identifications based on the extracted packet header information.

4. The processing method of claim 2, wherein the selected first transport stream data is stored in a hard disk drive.

5. A method of processing plural transport streams of data having different structures using a transport stream demultiplexer, the method comprising:
   simultaneously inputting the plural transport streams of data having different structures;
   extracting packet header information from the plural transport streams and using the extracted packet header information to allow only packets designated as program data to pass;
   providing program data to a first external output interface for storage or transmission over a network while simultaneously providing the program data to a second external output interface for reproduction, according to a user selection, the method being performed by the transport stream demultiplexer.

* * * * *